UNITED STATES PATENT OFFICE 2,411,283

PIPERIDINOETHANOL ESTER OF DI-N-BUTYL ACETIC ACID

Henry Martin and Alfred Margot, Basel, Switzerland, assignors to J. R. Geigy A. G., Basel, Switzerland, a Swiss firm No Drawing. Application July 14, 1944, Serial No. 545,006. In Switzerland August 4, 1943

1 Claim. (Cl. 260—294)

According to experiments made by Fromherz as well as by other authors (cf. Arch. exp. Path. u. Pharm. 173 124 (1933) basic esters of aliphatic carboxylic acids do not show antispasmodic properties in any great extent. Moreover, aliphatic carboxylic acid esters having become known from the patent literature, such as the isovalerianic acid or α-bromo-isovalerianic acid or isopropyl-allyl acetic acid or diethyl acetic acid ester of the 3-diethylamino-2:2-dimethyl-1-propanol also possess an extremely small neurotropic-atropine-like behaviour. The esters mentioned by Halpern (Arch. internat. de Pharmacodyn. 59 149 (1938)), such as the ethylbutyl acetic acid or dibutyl acetic acid ester of the diethylaminoethanol, the dibutyl acetic acid ester of the diethylamino-(1)-propanol-(3), the acetic acid, propionic acid, n-butyric acid, diethyl acetic acid, ethylbutyl acetic acid or dibutyl acetic acid ester of the diethyl-amino-(1)-pentanol-(4) do not possess much better properties.

In contradistinction thereto it has surprisingly been found that the piperidinoethanol ester of the di-n-butyl acetic acid possesses valuable antispasmodic properties. This behaviour, of course, was not to be expected.

For the preparation of the said ester, for instance, reactive derivatives of the di-n-butyl acetic acid, i. e. its halides, esters or anhydrides are caused to react in the presence or absence of condensation agents with piperidinoethanol, or reactive esters of the piperidinoethanol are interacted, possibly in the presence of acid binding agents, with the said acid or its salts respectively.

As reactive esters of the piperidinoethanol may be understood especially esters with hydrogen halide acids, with aryl sulfonic acids and the like.

Furthermore, it is also possible to convert di-n-butyl acetic acid into its halogen ethyl esters and to interact the latter with piperidine. For the production of the halogen ethyl esters it is advantageous to cause ethylene halogen hydrines to react in the presence or absence of condensation agents with di-n-butyl acetic acid or its halides, esters or anhydride respectively or to allow ethylene halogen hydrines or ethylene dihalides to interact with salts of the said acid, finally replacing the hydroxyl groups, which eventually are present in the obtained compounds, by halogen.

The basic ester thus obtained is water-soluble in form of its salts with inorganic or organic acids.

The invention is now illustrated, but not limited by the following examples, wherein the parts are by weight.

Example 1

9.5 parts of di-n-butylacetic acid chloride are added, while stirring, to 6.8 parts of piperidino-ethanol; the so-obtained mixture is heated for a short time to 160° C. under stirring, whereby under development of heat a clear brown oil is obtained which, advantageously still warm, is diluted with water. The aqueous solution is sometimes extracted with ether and then the base is made free by means of concentrated ammonia. The base is extracted with ether and, after having washed the ethereal solution once with water and dried, the solvent is distilled off. The residue boils at 167°–169° C. at a pressure of 11 mm. The hydrochloride of the ester melts at 123°–124° C.

Example 2

35 parts of di-n-butyl acetic acid chloride are interacted with 17 parts of ethylene chlorohydrine in the presence of pyridine. After completion of the reaction the mixture is shaken with ether and water, the ethereal solution is dried and the solvent distilled off. The residue is fractionated in vacuo and 20 parts of the so-obtained di-n-butyl acetic acid-β-chlorethyl ester are caused to react in the warmth with 14 parts of piperidine. Then the mixture is shaken with ether and water. After having dried the ethereal solution, the solvent is distilled off. The residue boils at 11 mm. pressure at 167°–169° C.

What we claim is:

The piperidinoethanolester of di-n-butyl acetic acid of the formula

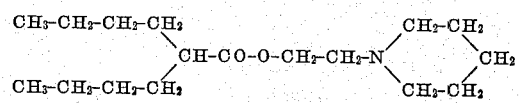

being a colorless liquid, boiling at 167°–169° C. at 11 mm., having valuable therapeutical properties.

HENRY MARTIN.
ALFRED MARGOT.